(12) United States Patent
Hwang et al.

(10) Patent No.: US 9,660,295 B2
(45) Date of Patent: May 23, 2017

(54) ELECTROLYTE AND RECHARGEABLE LITHIUM BATTERY INCLUDING THE SAME

(71) Applicant: SAMSUNG SDI CO., LTD., Yongin-si, Gyeonggi-do (KR)

(72) Inventors: Hee-Yeon Hwang, Yongin-si (KR); Ho-Seok Yang, Yongin-si (KR); Yun-Hee Kim, Yongin-si (KR); Jin-Hyeok Lim, Yongin-si (KR); Min-Young Lee, Yongin-si (KR); Se-Jeong Park, Yongin-si (KR); Hyun-Woo Kim, Yongin-si (KR)

(73) Assignee: Samsung SDI CO., Ltd., Yongin-Si, Gyeonggi-do (KR)

( * ) Notice: Subject to any disclaimer, the term of this patent is extended or adjusted under 35 U.S.C. 154(b) by 7 days.

(21) Appl. No.: 14/790,585

(22) Filed: Jul. 2, 2015

(65) Prior Publication Data

US 2016/0056505 A1      Feb. 25, 2016

(30) Foreign Application Priority Data

Aug. 22, 2014   (KR) .................. 10-2014-0109605

(51) Int. Cl.
*H01M 10/0567*   (2010.01)
*H01M 10/42*   (2006.01)
(Continued)

(52) U.S. Cl.
CPC ... *H01M 10/0567* (2013.01); *H01M 10/4235* (2013.01); *H01M 4/525* (2013.01);
(Continued)

(58) Field of Classification Search
None
See application file for complete search history.

(56) References Cited

U.S. PATENT DOCUMENTS

| 2003/0113635 A1 | 6/2003 | Gan et al. |
| 2010/0047695 A1* | 2/2010 | Smart ............... H01M 10/0567 429/307 |
| 2015/0171477 A1* | 6/2015 | Takahashi ............. H01M 4/505 429/326 |

FOREIGN PATENT DOCUMENTS

| KR | 10-2009-0053467 A | 5/2009 |
| KR | 10-2010-0013806 A | 2/2010 |

(Continued)

*Primary Examiner* — Alix Eggerding
(74) *Attorney, Agent, or Firm* — Lee & Morse, P.C.

(57) ABSTRACT

An electrolyte for a rechargeable lithium battery and a rechargeable lithium battery, the electrolyte including a lithium salt, a non-aqueous organic solvent, and an additive represented by the following Chemical Formula 1:

[Chemical Formula 1]

$$\text{NC}-R^1-O-\underset{\underset{R^2-\text{CN}}{|}}{\overset{\overset{O}{\|}}{P}}-O-R^3-\text{CN}$$

wherein, in Chemical Formula 1, $R^1$ to $R^3$ are each independently a substituted or unsubstituted C1 to C10 alkylene group, a substituted or unsubstituted C3 to C30 cycloalkylene group, a substituted or unsubstituted C6 to C30 arylene group, or a substituted or unsubstituted C2 to C30 heteroarylene group.

12 Claims, 2 Drawing Sheets

(51) Int. Cl.
    *H01M 10/0568*    (2010.01)
    *H01M 10/0569*    (2010.01)
    *H01M 4/525*       (2010.01)
    *H01M 10/052*     (2010.01)
    *H01M 4/02*        (2006.01)

(52) U.S. Cl.
    CPC ...... *H01M 10/052* (2013.01); *H01M 10/0568* (2013.01); *H01M 10/0569* (2013.01); *H01M 2004/021* (2013.01); *H01M 2300/0037* (2013.01)

(56) References Cited

FOREIGN PATENT DOCUMENTS

| | | |
|---|---|---|
| KR | 10-2013-0098126 A | 9/2013 |
| WO | WO 2010/030008 A1 | 3/2010 |

\* cited by examiner

ELECTROLYTE AND RECHARGEABLE LITHIUM BATTERY INCLUDING THE SAME

CROSS-REFERENCE TO RELATED APPLICATION

Korean Patent Application No. 10-2014-0109605, filed on Aug. 22, 2014, in the Korean Intellectual Property Office, and entitled: "Electrolyte and Rechargeable Lithium Battery Including Same," is incorporated by reference herein in its entirety.

BACKGROUND

1. Field

Embodiments relate to an electrolyte for a rechargeable lithium battery and a rechargeable lithium battery including the same.

2. Description of the Related Art

Batteries transform chemical energy (generated from an electrochemical redox reaction of a chemical material thereinside) into electrical energy. Batteries may be a primary battery, which should be disposed when its energy is all consumed, or a rechargeable battery, which may be many times recharged. A smaller-sized and slim rechargeable lithium battery that is used for a mobile phone, a laptop, an electric tool or the like may include a positive electrode, a negative electrode, an electrolyte, or the like. Such a battery may use a lithium metal-mixed oxide as a positive active material, a carbon material or the like as a negative active material, and an electrolyte obtained by dissolving a lithium salt in a suitable amount in an organic solvent.

SUMMARY

Embodiments are directed to an electrolyte for a rechargeable lithium battery and a rechargeable lithium battery including the same.

The embodiments may be realized by providing an electrolyte for a rechargeable lithium battery, the electrolyte including a lithium salt, a non-aqueous organic solvent, and an additive represented by the following Chemical Formula 1:

[Chemical Formula 1]

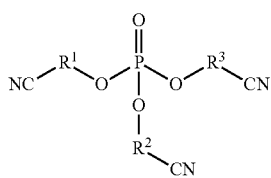

wherein, in Chemical Formula 1, $R^1$ to $R^3$ are each independently a substituted or unsubstituted C1 to C10 alkylene group, a substituted or unsubstituted C3 to C30 cycloalkylene group, a substituted or unsubstituted C6 to C30 arylene group, or a substituted or unsubstituted C2 to C30 heteroarylene group.

In Chemical Formula 1, at least one of $R^1$ to $R^3$ may be a substituted or unsubstituted C6 to C30 arylene group.

In Chemical Formula 1, $R^1$ to $R^3$ may be a substituted or unsubstituted C6 to C30 arylene group.

The additive represented by Chemical Formula 1 may be included in the electrolyte in an amount of about 2 wt % to about 5 wt %, based on a total weight of the electrolyte for a rechargeable lithium battery.

The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, in which x and y are natural numbers, LiCl, LiI, or a combination thereof.

The lithium salt may be included in the electrolyte at a concentration of about 0.1 M to about 2.0 M.

The non-aqueous organic solvent may include about 20 wt % or more of ethylene carbonate, based on a total weight of the non-aqueous organic solvent.

The embodiments may be realized by providing a rechargeable lithium battery including the electrolyte according to an embodiment; a positive electrode; and a negative electrode.

The positive electrode may include a positive active material, and the positive active material may include a lithium cobalt-based oxide.

The rechargeable lithium battery may be a prismatic battery having an area of greater than or equal to about 50 $cm^2$.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
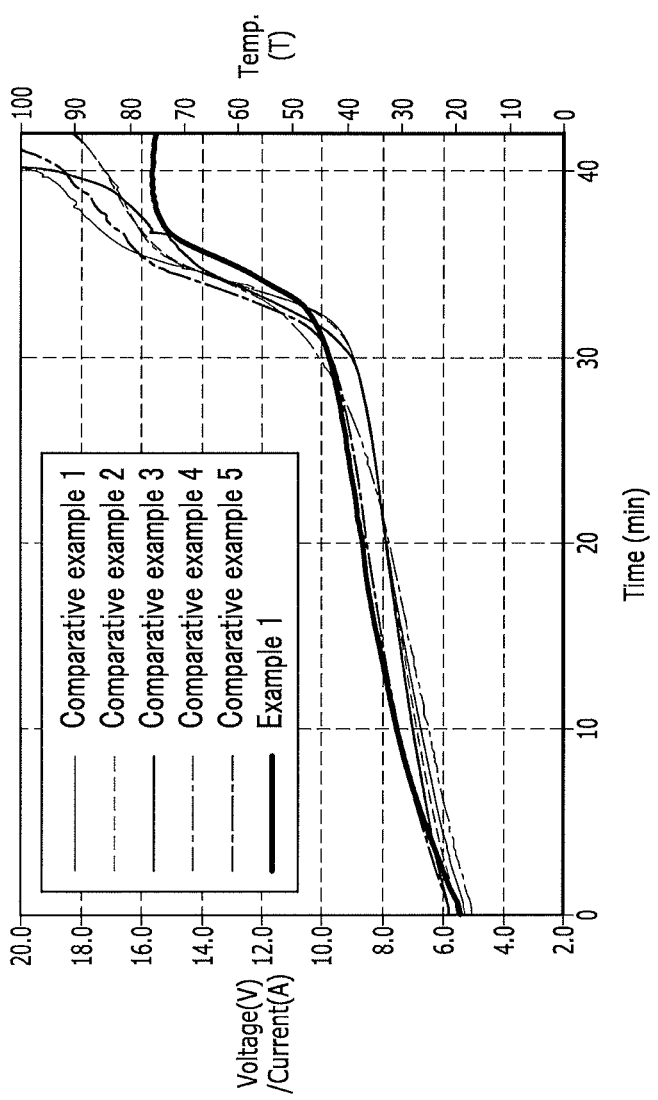
FIG. 1 illustrates a graph showing overcharge evaluation of battery cells according to an Example and Comparative Examples.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, when a definition is not otherwise provided, the term 'substituted' refers to one substituted with a halogen (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, C3 to C30 cycloalkyl group, a C3 to C15 cycloalkenyl group, a C6 to C15 cycloalkynyl group, a C2 to C20 heterocycloalkyl group, or a combination thereof, instead of at least one hydrogen of a compound.

As used herein, when a definition is not otherwise provided, the term 'hetero' refers to one including 1 to 3 heteroatoms selected from N, O, S, and P.

An electrolyte for a rechargeable lithium battery according to an embodiment may include, e.g., a lithium salt, a non-aqueous organic solvent, and an additive represented by the following Chemical Formula 1.

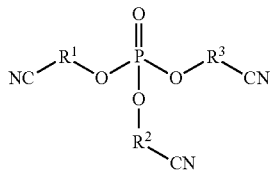

[Chemical Formula 1]

In Chemical Formula 1, $R^1$ to $R^3$ may each independently be a substituted or unsubstituted C1 to C10 alkylene group, a substituted or unsubstituted C3 to C30 cycloalkylene group, a substituted or unsubstituted C6 to C30 arylene group, or a substituted or unsubstituted C2 to C30 heteroarylene group.

A redox shuttle additive circulating an overcurrent inside a cell to help prevent a high voltage, and another additive forming a thin film at a positive electrode may be used to help improve the overcharge problem of a battery. However, these additives may be decomposed during cell charge and discharge and thus, may deteriorate a high temperature cycle-life, may generate gas, and the like, as a high-capacity and high voltage battery is pursued.

The additive represented by the above Chemical Formula 1 may be polymerized through a radical reaction, e.g., as a voltage is increased to generate heat, which increases a battery temperature. Thus, the additive may play a role of operating a safety protection device which cuts off a voltage and a current applied in a battery when the battery temperature reaches or exceeds a predetermined level. Accordingly, the electrolyte for a rechargeable lithium battery according to an embodiment may not cause high temperature cycle-life degradation, gas generation, or the like, and may help prevent an overcharge problem.

In the above Chemical Formula 1, at least one of $R^1$ to $R^3$ may be a substituted or unsubstituted C6 to C30 arylene group. In this case, the additive represented by the above Chemical Formula 1 may effective play a role of overcharge inhibition.

In an implementation, in the above Chemical Formula 1, $R^1$ to $R^3$ may, e.g., all, be a substituted or unsubstituted C6 to C30 arylene group. In this case, the additive represented by the above Chemical Formula 1 may play a role of overcharge inhibition.

In an implementation, the C1 to C10 alkylene group may be, e.g., a C1 to C8 alkylene group or a C1 to C5 alkylene group. The C3 to C30 cycloalkylene group may be, e.g., a C3 to C25 cycloalkylene group, a C3 to C20 cycloalkylene group, a C3 to C15 cycloalkylene group, or a C3 to C10 cycloalkylene group. The C6 to C30 arylene group may be, e.g., a C6 to C25 arylene group, a C6 to C20 arylene group, a C6 to C15 arylene group, or a C6 to C10 arylene group. The C2 to C30 heteroarylene group may be, e.g., a C2 to C25 heteroarylene group, a C2 to C20 heteroarylene group, a C2 to C15 heteroarylene group, or a C2 to C10 heteroarylene group.

In an implementation, the substituted or unsubstituted C6 to C30 arylene group may be, e.g., a phenylene group.

The additive represented by the above Chemical Formula 1 may be included in the electrolyte in an amount of about 2 wt % to about 5 wt %, e.g., about 2 wt % to about 4 wt %, based on a total weight of the electrolyte for a rechargeable lithium battery. In this case, the additive represented by the above Chemical Formula 1 may play a role of overcharge inhibition effectively.

The lithium salt may be dissolved in an organic solvent, may supply lithium ions in a battery, may operate a basic operation of the rechargeable lithium battery, and may help improve lithium ion transportation between positive and negative electrodes therein.

Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (in which x and y are natural numbers, e.g. an integer of 1 to 20), LiCl, LiI, or a mixture thereof.

The lithium salt may be included in the electrolyte in a concentration of about 0.1 M to about 2.0 M. When the lithium salt is included at the above concentration range, an electrolyte may have excellent performance and lithium ion mobility due to optimal electrolyte conductivity and viscosity.

The non-aqueous organic solvent may serve as a medium for transmitting ions taking part in the electrochemical reaction of a battery.

The non-aqueous organic solvent may include, e.g., a carbonate-based solvent, an ester-based solvent, an ether-based solvent, a ketone-based solvent, an alcohol-based solvent, or an aprotic solvent.

The carbonate based solvent may include, e.g., dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

In an implementation, the carbonate-based solvent may include, e.g., a combination of ethylene carbonate (EC), ethylmethyl carbonate (EMC), and dimethyl carbonate (DMC). In an implementation, the ethylene carbonate (EC) may be included in an amount of greater than or equal to about 20 wt %, e.g., about 20 wt % to about 90 wt %, based on a total weight of the non-aqueous organic solvent. When the ethylene carbonate (EC) is included within the range, a dielectric constant may increase, and ion conductivity may be improved.

The non-aqueous organic solvent may include the ester-based solvent, the ether-based solvent, the ketone-based solvent, the alcohol-based solvent, and/or the aprotic solvent, as well as the carbonate based solvent.

The ester-based solvent may include, e.g., methyl acetate, ethyl acetate, n-propyl acetate, dimethylacetate, methylpropionate, ethylpropionate, gamma-butyrolactone, decanolide, gamma-valerolactone, mevalonolactone, caprolactone, or the like.

The ether-based solvent may include, e.g., dibutyl ether, tetraglyme, diglyme, dimethoxyethane, 2-methyltetrahydrofuran, tetrahydrofuran, and the like, and the ketone-based solvent may include cyclohexanone, or the like.

The alcohol-based solvent may include, e.g., ethanol, isopropyl alcohol, or the like. The aprotic solvent may include, e.g., nitriles such as R—CN (in which R is a hydrocarbon group having a C2 to C20 linear, branched, or cyclic structure, and may include a double bond, an aromatic ring, or an ether bond) or the like, amides such as dimethylformamide or the like, dioxolanes such as 1,3-dioxolane or the like, sulfolanes, or the like.

The non-aqueous organic solvent may be used singularly or in a mixture. When the organic solvent is used in a mixture, the mixture ratio may be controlled in accordance with a desirable battery performance.

The carbonate-based solvent may be prepared by mixing a cyclic carbonate and a linear carbonate. The cyclic carbonate and the linear carbonate may be mixed together in the volume ratio of about 1:1 to about 1:9. Within this range, performance of electrolyte may be improved.

In an implementation, the non-aqueous organic solvent may further include the aromatic hydrocarbon-based organic solvent with the carbonate based solvent. The carbonate-based and the aromatic hydrocarbon-based solvents may be mixed together in a volume ratio of about 1:1 to about 30:1.

Examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

Figure 2:
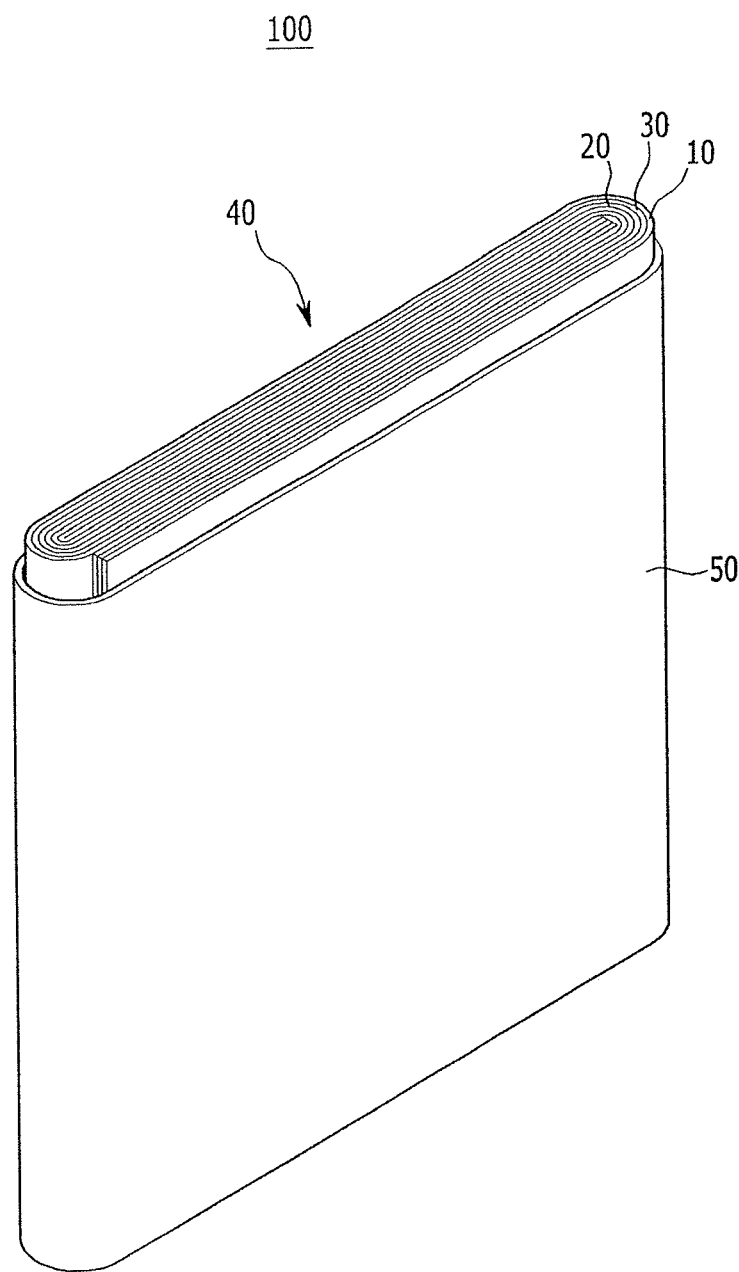
FIG. 2 illustrates a rechargeable lithium battery according to an embodiment.

Another embodiment may provide a rechargeable lithium battery including the electrolyte, a positive electrode, and a negative electrode. FIG. 2 illustrates a rechargeable lithium battery according to an embodiment.

Referring to FIG. 2, a rechargeable lithium battery 100 according to one embodiment includes an electrode assembly 40 in which a separator 30 is interposed between a positive electrode 10 and a negative electrode 20, and a case 50 housing the electrode assembly 40. The positive electrode 10, the negative electrode 20 and the separator 30 are impregnated in an electrolyte solution (e.g., with the electrolyte). The rechargeable lithium battery according to an embodiment may be classified as, e.g., a lithium ion battery, a lithium ion polymer battery, or a lithium polymer battery, depending on kinds of a separator and an electrolyte. The rechargeable lithium battery according to an embodiment may be classified as, e.g., cylindrical, prismatic, coin-type, pouch-type, or the like, depending on a shape thereof. In addition, it may be bulk type and thin film type depending on size. Suitable structures and manufacturing methods for lithium ion batteries may be used.

In an implementation, the rechargeable lithium battery according to an embodiment may have an area of greater than or equal to about 50 cm$^2$. In an implementation, the rechargeable lithium battery according to an embodiment may be a prismatic battery. In an implementation, one side of the prismatic battery may have a surface area of greater than or equal to about 50 cm$^2$.

In an implementation, the rechargeable lithium battery may be formed with a cylindrical shape and may include a negative electrode, a positive electrode, a separator between the positive electrode and negative electrode, an electrolyte impregnated in the negative electrode, the positive electrode, and the separator, a battery case, and a sealing member sealing the battery case. The rechargeable lithium battery may be manufactured by sequentially stacking a negative electrode, a positive electrode, and a separator, and spiral-winding them and housing the wound product in the battery case.

The positive electrode may include a current collector and a positive active material layer on the current collector.

The current collector may include, e.g., aluminum (Al).

The positive active material layer may include, e.g., a positive active material and a binder. In an implementation, the positive active material may include a conductive material.

The positive active material may include lithiated intercalation compounds that reversibly intercalate and deintercalate lithium ions. For example, at least one composite oxide of lithium and a metal of cobalt, manganese, nickel, or a combination thereof may be used, and specific examples thereof may be a compound represented by one of the following chemical formulae. $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G is Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

In an implementation, the positive active material may be, e.g., a lithium cobalt-based oxide. The lithium cobalt-based oxide may be, e.g., $Li_aCoM_bO_2$, in which $0.90 \leq a \leq 1.5$, $0.001 \leq b \leq 0.1$, and may be is Al, Cr, Mn, Fe, Mg, La, Ce, Sr, V, or a combination thereof.

The binder may help improve binding properties of positive active material particles with one another and with a current collector. The binder includes a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxymethyl cellulose, hydroxypropylmethyl cellulose, methyl cellulose, or alkali metal salts thereof. In some embodiments, the alkali metal may be Na, K, or Li. Such a thickener may be included in an amount of about 0.1 parts by weight to about 3 parts by weight based on 100 parts by weight of the negative active material.

The conductive material may help improve electrical conductivity of an electrode. A suitable electrically conductive material that does not cause a chemical change may be used as the conductive material. Examples thereof may include one or more of natural graphite, artificial graphite, carbon black, acetylene black, ketjen black, carbon fiber, a metal powder, a metal fiber, and the like, of copper, nickel, aluminum, silver, and the like, a conductive material such as a polyphenylene derivative and the like.

The negative electrode may include a current collector and a negative active material layer formed on the current collector.

The current collector may be, e.g., a copper foil, a nickel foil, a stainless steel foil, a titanium foil, a nickel foam, a copper foam, a polymer substrate coated with a conductive metal, or a combination thereof.

The negative active material layer may include a negative active material and a binder. In an implementation, the negative active material may include a conductive material.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions may include a carbon material, and may be a suitable carbon-based negative active material in a rechargeable lithium ion rechargeable battery. Examples thereof may include crystalline carbon, amorphous carbon, or a combination thereof. The crystalline carbon may be non-shaped, or may be sheet, flake, spherical, or fiber shaped natural graphite or artificial graphite. The amorphous carbon may be a soft carbon, a hard carbon, mesophase pitch carbonized products, fired coke, and the like.

For example, the soft carbon may have higher output characteristics, shorter charge time and higher price or stability than graphite or hard carbon and thus, may be appropriate for a large capacity battery such as a battery for ISG.

The lithium metal alloy may be an alloy of lithium and a metal of Na, K, Rb, Cs, Fr, Be, Mg, Ca, Sr, Si, Sb, Pb, In, Zn, Ba, Ra, Ge, Al, or Sn.

The material being capable of doping and dedoping lithium may include Si, $SiO_x$ (0<x<2), a Si—C composite, a Si-Q alloy (in which Q is an alkali metal, an alkaline-earth metal, Group 13 to 16 elements, a transition metal, a rare earth element, or a combination thereof, and not Si), Sn, $SnO_2$, a Sn—C composite, Sn—R (in which R is an alkali metal, an alkaline-earth metal, Group 13 to 16 elements, a transition metal, a rare earth element, or a combination thereof, and not Sn), and the like. Examples of the Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include, e.g., vanadium oxide, lithium vanadium oxide, or the like.

The binder may help binding properties of negative active material particles with one another and with a current collector, and examples thereof may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may help improve electrical conductivity of an electrode. A suitable electrically conductive material that does not cause a chemical change may be used. Examples thereof may include a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof.

The positive electrode and the negative electrode may be manufactured by a method including mixing each active material, a binder, and a conductive material to provide an active material slurry, and coating the active material slurry on a current collector. The solvent may include, e.g., N-methylpyrrolidone or the like.

The separator may include a suitable material used in a lithium battery, e.g., a material that separates a negative electrode from a positive electrode and that provides a transporting passage for lithium ion. For example, the separator may have a low resistance to ion transportation and an excellent impregnation for an electrolyte. For example, the separator may be selected from glass fiber, polyester, TEFLON (tetrafluoroethylene), polyethylene, polypropylene, polytetrafluoroethylene (PTFE), or a combination thereof. It may have a form of a non-woven fabric or a woven fabric.

For example, a polyolefin-based polymer separator such as polyethylene, polypropylene or the like may be used for a lithium ion battery. In order to help ensure the heat resistance or mechanical strength, a coated separator including a ceramic component or a polymer material may be used. In an implementation, it may have a mono-layered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Rechargeable Lithium Battery Cell

EXAMPLE 1

An electrolyte solution was prepared by mixing ethylene carbonate (EC) and ethylmethyl carbonate (EMC) in a volume ratio of 3:7, preparing a 1.3M $LiPF_6$ solution in the mixed solvent, and adding 3 wt % of tris(4-cyanophenyl) phosphate (TCP) thereto.

As a positive electrode, 97.45 wt % of $LiCoO_2$ as a positive active material, 1.35 wt % of polyvinylidene fluoride as a binder, and 1.2 wt % of acetylene black as a conductive material were mixed, and the mixture was added to N-methyl-2-pyrrolidone, preparing positive electrode slurry. The positive electrode slurry was coated on an aluminum foil and then, dried in a 120° C. vacuum oven and compressed, fabricating the positive electrode.

As a negative electrode, 98 wt % of graphite as a negative active material, 1 wt % of SBR (a styrene butadiene rubber) as a binder, and 1 wt % of CMC (carboxy methyl cellulose) as a thickener were mixed in water to prepare negative electrode slurry. The negative electrode slurry was coated on a copper foil and then, compressed and dried in a 145° C. vacuum oven for 6 hours, fabricating the negative electrode.

Then, a 16 μm-thick porous separation membrane made of polyethylene as a separator was interposed between the positive and negative electrodes, obtaining an electrode assembly. The electrode assembly was spirally wound and compressed and then, housed in a prismatic can having an area of 50 cm². Subsequently, the electrolyte solution was injected into the can, and then, the can was sealed, obtaining a rechargeable lithium battery cell.

Then, an overcharge test of the rechargeable lithium battery cell was conducted by attaching a safety protection device to a negative electrode tap and applying (−) thereto while applying (+) to the positive electrode of the cell.

COMPARATIVE EXAMPLE 1

A rechargeable lithium battery cell was manufactured according to the same method as Example 1 except that ethylene carbonate (EC) and ethylmethyl carbonate (EMC) were mixed in a volume ratio of 3:7 and a 1.3 M LiPF$_6$ solution was prepared in the mixed solvent (without including the TCP).

COMPARATIVE EXAMPLE 2

A rechargeable lithium battery cell was manufactured according to the same method as Example 1 except that the ethylene carbonate (EC) and ethylmethyl carbonate (EMC) were mixed in a volume ratio of 3:7, a 1.3 M LiPF$_6$ solution was prepared in the mixed solvent, and 1 wt % of tris(4-fluorophenyl)phosphate (TFP) was added thereto (instead of TCP).

COMPARATIVE EXAMPLE 3

A rechargeable lithium battery cell was manufactured according to the same method as Example 1 except that the ethylene carbonate (EC) and ethylmethyl carbonate (EMC) were mixed in a volume ratio of 3:7, a 1.3 M LiPF$_6$ solution was prepared in the mixed solvent, and 3 wt % of tris(4-fluorophenyl)phosphate (TFP) was added thereto (instead of TCP).

COMPARATIVE EXAMPLE 4

A rechargeable lithium battery cell was manufactured according to the same method as Example 1 except that the ethylene carbonate (EC) and ethylmethyl carbonate (EMC) were mixed in a volume ratio of 3:7, a 1.3 M LiPF$_6$ solution was prepared in the mixed solvent, and 3 wt % of 4-cyanophenyl diethyl phosphate (CPDEP) was added thereto (instead of TCP).

COMPARATIVE EXAMPLE 5

A rechargeable lithium battery cell was manufactured according to the same method as Example 1 except that the ethylene carbonate (EC) and ethylmethyl carbonate (EMC) were mixed in a volume ratio of 3:7, a 1.3 M LiPF$_6$ solution was prepared in the mixed solvent, and 3 wt % of bis(4-cyanophenyl)phosphate (BCPP) was added thereto (instead of TCP).

EVALUATION EXAMPLE 1

Overcharge Evaluation

An overcharge evaluation of the rechargeable lithium battery cells according to Example 1 and Comparative Examples 1 to 5 was conducted, and the result is provided in Table 1 and in FIG. 1.

The overcharge evaluation was performed by welding and fixing a safety protection device at the negative electrode and a tap at the positive electrode of each cell and attaching a thermocouple in the right middle of the cell to measure a temperature. Then, the cell was wrapped with an insulator, and its temperature was measured by connecting the positive and negative electrodes and applying a predetermined voltage and a predetermined current (18.5 V, 1 C) to the cell.

TABLE 1

| | Electrolyte solution | Maximum temperature of cell (° C.) | Overcharge test |
|---|---|---|---|
| Comparative Example 1 | 1.3M EC:EMC = 3:7 | 499 | NG (ignition) |
| Comparative Example 2 | 1.3M EC:EMC = 3:7, TFP 1 wt % | 499 | NG (ignition) |
| Comparative Example 3 | 1.3M EC:EMC = 3:7, TFP 3 wt % | 499 | NG (ignition) |
| Comparative Example 4 | 1.3M EC:EMC = 3:7, CPDEP 3 wt % | 499 | NG (ignition) |
| Comparative Example 5 | 1.3M EC:EMC = 3:7, BCPP 3 wt % | 499 | NG (ignition) |
| Example 1 | 1.3M EC:EMC = 3:7, TCP 3 wt % | 77 | OK |

In the above Table 1, OK indicates that the cell did not explode, but remained the same as before the evaluation when overcharged for 2 hours, and NG indicates that the cell was ignited and thus, tore apart its can and exposed a jelly-roll therein.

Referring to Table 1, the cell of Example 1 showed a remarkably low maximum temperature and was not ignited during the overcharge test, compared with the cells of Comparative Examples 1 to 5.

FIG. 1 illustrates a graph showing the overcharge evaluation results of the cells.

Referring to FIG. 1, the additive of Example 1 was decomposed from the evaluation beginning and gradually increased a temperature, and the safety protection device thereof worked in a CV mode and decreased the temperature, while the additives of Comparative Examples 1 to 5 were decomposed but generated no heat, or the safety protection devices thereof hardly worked due to a sharp temperature increase right before the CV mode.

For example, when a cell is overcharged by applying a predetermined current and voltage, internal temperature of the cell may start to increase and may gradually keep increasing by a constant current (CC) applied thereto in a full-charge state, and the CC may be converted into CV (a constant voltage) as a positive electrode is destroyed. However, the internal temperature of the cell including the effective overcharge additive according to an embodiment increased even before being converted into a CV mode due to decomposition of the additive, and reached a working temperature range of the safety protection device, so that the safety protection device worked. However, when the overcharge additive did not work, thermal runaway inside the cell occurred right before the CV mode and made the safety protection device out of control and thus, ignited the cell.

By way of summation and review, as battery safety has been considered to be important, development of the electrolyte in a battery system has been consider to help secure high safety without adversely influencing reliability characteristics in a high-capacity and high voltage cell. One material used as an additive for helping to prevent an overcharge may be decomposed during cell charge and discharge and thus, high temperature cycle-life may be deteriorated and gas may be generated as a high-capacity and high voltage battery is pursued. An additive may have an excellent overcharge effect.

The embodiments may provide an electrolyte for a rechargeable lithium battery having improved overcharge inhibition effect.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a rechargeable lithium battery, the electrolyte comprising:
    a lithium salt,
    a non-aqueous organic solvent, and
    an additive represented by the following Chemical Formula 1:

[Chemical Formula 1]

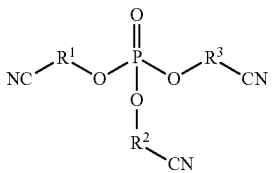

wherein, in Chemical Formula 1, $R^1$ to $R^3$ are each independently a substituted or unsubstituted C1 to C10 alkylene group, a substituted or unsubstituted C3 to C30 cycloalkylene group, a substituted or unsubstituted C6 to C30 arylene group, or a substituted or unsubstituted C2 to C30 heteroarylene group, further provided that at least one of $R^1$ to $R^3$ is the substituted or unsubstituted C6 to C30 arylene group.

2. The electrolyte for a rechargeable lithium battery as claimed in claim 1, wherein, in Chemical Formula 1, $R^1$ to $R^3$ are a substituted or unsubstituted C6 to C30 arylene group.

3. The electrolyte for a rechargeable lithium battery as claimed in claim 1, wherein the additive represented by Chemical Formula 1 is included in the electrolyte in an amount of about 2 wt % to about 5 wt %, based on a total weight of the electrolyte for a rechargeable lithium battery.

4. The electrolyte for a rechargeable lithium battery as claimed in claim 1, wherein the lithium salt includes $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, in which x and y are natural numbers, LiCl, LiI, or a combination thereof.

5. The electrolyte for a rechargeable lithium battery as claimed in claim 1, wherein the lithium salt is included in the electrolyte at a concentration of about 0.1 M to about 2.0 M.

6. The electrolyte for a rechargeable lithium battery as claimed in claim 1, wherein the non-aqueous organic solvent includes about 20 wt % or more of ethylene carbonate, based on a total weight of the non-aqueous organic solvent.

7. A rechargeable lithium battery, comprising:
    the electrolyte as claimed in claim 1;
    a positive electrode; and
    a negative electrode.

8. The rechargeable lithium battery as claimed in claim 7, wherein:
    the positive electrode includes a positive active material, and
    the positive active material includes a lithium cobalt-based oxide.

9. The rechargeable lithium battery as claimed in claim 7, wherein the rechargeable lithium battery is a prismatic battery having an area of greater than or equal to about 50 $cm^2$.

10. The electrolyte for a rechargeable lithium battery as claimed in claim 1, wherein, in Chemical Formula 1, $R^1$ to $R^3$ are an unsubstituted C1 to C 10 alkylene group, unsubstituted C3 to C30 cycloalkylene group, unsubstituted C6 to C30 arylene group, or unsubstituted C2 to C30 heteroarylene group, at least one of $R^1$ to $R^3$ being substituted or unsubstituted C6 to C30 arylene group.

11. The electrolyte for a rechargeable lithium battery as claimed in claim 10, wherein, in Chemical Formula 1, $R^1$ to $R^3$ are the unsubstituted C6 to C30 arylene group.

12. The electrolyte for a rechargeable lithium battery as claimed in claim 10, wherein, in Chemical Formula 1, $R^1$ to $R^3$ are an unsubstituted phenylene group.

* * * * *